(12) United States Patent
Yang et al.

(10) Patent No.: US 11,846,601 B2
(45) Date of Patent: Dec. 19, 2023

(54) SENSOR AND METHOD FOR GAS TESTING

(71) Applicant: Carrier Corporation, Palm Beach Gardens, FL (US)

(72) Inventors: Zhiwei Yang, South Windsor, CT (US); Lei Chen, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 558 days.

(21) Appl. No.: 16/613,083

(22) PCT Filed: May 10, 2018

(86) PCT No.: PCT/US2018/032061
§ 371 (c)(1),
(2) Date: Nov. 12, 2019

(87) PCT Pub. No.: WO2018/209082
PCT Pub. Date: Nov. 15, 2018

(65) Prior Publication Data
US 2020/0080958 A1    Mar. 12, 2020

Related U.S. Application Data

(60) Provisional application No. 62/505,648, filed on May 12, 2017.

(51) Int. Cl.
*G01N 27/404* (2006.01)
*G01N 27/407* (2006.01)
*G01N 27/22* (2006.01)

(52) U.S. Cl.
CPC ....... *G01N 27/404* (2013.01); *G01N 27/4074* (2013.01); *G01N 27/4075* (2013.01); *G01N 2027/222* (2013.01)

(58) Field of Classification Search
CPC ............ G01N 2027/222; G01N 27/22; G01N 27/404; G01N 27/407; G01N 27/4075;
(Continued)

(56) References Cited

U.S. PATENT DOCUMENTS 4,012,291 A * 3/1977 Olson ................ G01N 27/4045
205/787
4,668,473 A * 5/1987 Agarwal .............. B01J 19/0033
422/111
(Continued)

FOREIGN PATENT DOCUMENTS

CN         103412022 A     11/2013
CN         104076063 A     10/2014
(Continued)

OTHER PUBLICATIONS

International Search Report Issued in International Application No. PCT/US2018/032061 dated Jul. 18, 2018; 6 Pages.
(Continued)

*Primary Examiner* — Harshad R Patel
*Assistant Examiner* — Gedeon M Kidanu
(74) *Attorney, Agent, or Firm* — CANTOR COLBURN LLP

(57) ABSTRACT

A method of testing a gas includes providing a sensor including a sensing electrode that includes a catalyst comprising palladium, and a counter electrode that includes a metal catalyst. An electrolyte is disposed between the sensing electrode and the counter electrode, and an external electrical circuit connects the sensing electrode and the counter electrode. The gas is contacted with the sensing electrode in the absence of a voltage bias applied to the sensing and counter electrodes. A capacitive response is detected that is produced by the exposure of the sensing
(Continued)

electrode to the gas in the absence of a voltage bias applied to the sensing and counter electrodes.

18 Claims, 3 Drawing Sheets

(58) Field of Classification Search
CPC ........... G01N 27/4074; G01N 33/0054; G09G 2300/0465; G09G 3/3275; H01L 27/10882; H01L 27/3241; Y02A 50/20
See application file for complete search history.

(56) References Cited

U.S. PATENT DOCUMENTS

| | | | |
|---|---|---|---|
| 4,863,813 A | 9/1989 | Dyer | |
| 5,173,166 A | 12/1992 | Tomantschger et al. | |
| 5,573,648 A | 11/1996 | Shen et al. | |
| 5,906,718 A | 5/1999 | Hance et al. | |
| 7,022,213 B1 | 4/2006 | Austen et al. | |
| 7,678,251 B2 | 3/2010 | Chow et al. | |
| 8,840,775 B2* | 9/2014 | Chen | G01N 27/407 73/23.31 |
| 9,164,072 B2* | 10/2015 | Kunz | G01N 27/227 |
| 9,304,102 B2 | 4/2016 | Day et al. | |
| 9,518,952 B2 | 12/2016 | Chen et al. | |
| 2003/0145644 A1 | 8/2003 | Rabbett et al. | |
| 2005/0034987 A1 | 2/2005 | Zhou et al. | |
| 2005/0145494 A1* | 7/2005 | Inoue | G01N 27/4074 204/431 |
| 2005/0247572 A1* | 11/2005 | Scheffler | G01N 33/0006 205/775 |
| 2008/0317636 A1* | 12/2008 | Brahim | B82Y 30/00 422/98 |
| 2013/0153442 A1* | 6/2013 | Chen | G01N 27/407 205/789 |
| 2015/0027906 A1* | 1/2015 | Chen | G01N 27/4074 205/780.5 |
| 2016/0011159 A1* | 1/2016 | Sekiya | G01N 33/0036 73/23.31 |
| 2016/0178229 A1* | 6/2016 | Chen | F24F 11/30 62/126 |
| 2017/0010231 A1* | 1/2017 | Wouters | G01N 27/4045 |
| 2019/0025243 A1* | 1/2019 | Yu | G01N 27/4045 |
| 2019/0204265 A1* | 7/2019 | Stowell | G01N 33/0047 |

FOREIGN PATENT DOCUMENTS

| | | | | |
|---|---|---|---|---|
| DE | 102014214370 | | 1/2016 | |
| DE | 102014214370 A1 * | | 1/2016 | ........... G01N 27/407 |
| DE | 102014214399 A1 | | 1/2016 | |
| EP | 0138161 A2 | | 4/1985 | |
| EP | 1528613 A1 | | 5/2005 | |
| WO | 2016029003 A1 | | 2/2016 | |
| WO | 2016029005 A1 | | 2/2016 | |
| WO | WO-2016029005 A1 * | | 2/2016 | ......... G01N 27/4045 |
| WO | 2016126692 A1 | | 8/2016 | |
| WO | 2017019909 A1 | | 2/2017 | |

OTHER PUBLICATIONS

Written Opinion Issued in International Application No. PCT/US2018/032061 dated Jul. 18, 2018; 10 Pages.
Chinese Office Action for application CN 201880031501.2, dated Dec. 22, 2021, 14 pages.

* cited by examiner

SENSOR AND METHOD FOR GAS TESTING

CROSS-REFERENCE TO RELATED APPLICATIONS

This application is a national stage of PCT/US2018/032061 filed May 10, 2018, which claims priority to U.S. Provisional Application No. 62/505,648 filed May 12, 2017, the disclosure of which is incorporated herein by reference in its entirety.

BACKGROUND

Gas sensors for detecting hydrocarbons or substituted hydrocarbons have been used in various industrial or laboratory settings for process control. As the compounds can also be flammable or explosive, gas detection sensors have also been used for leak detection where such compounds are used or manufactured. Various types of sensors have been used or proposed. Examples include metal oxide semiconductor (MOS) sensors, non-dispersive infrared detector (NDIR) sensors, pellistor (pelletized resistor) sensors, and mixed potential utilizing high-temperature solid electrolytes made of ceramic such as perovskite.

New applications for hydrocarbons or substituted hydrocarbons have created and continue to create new challenges for gas detection sensors subject to cost constraints and selectivity requirements. One such application is in the field of cooling and heating, where older chlorinated hydrocarbons (CFCs) were eliminated due to their adverse impact on the earth's ozone layer. Chlorinated fluorocarbons were initially replaced with chlorofluorocarbons R12 (dichlorodifluoroethane); however, continued concerns with their ozone depleting potential (ODP) and new concerns with the compounds' global warming potential (GWP) led to their replacement with fluorinated hydrocarbons like R32 (GWP=675). Continued concerns with ODP and GWP, coupled with performance requirements in vapor compression heat transfer systems, have led to the development of new refrigerants such as fluorinated unsaturated hydrocarbons (i.e., hydrofluoroolefins) like trans-1,3,3,3-tetrafluoropropene (HFO R1234ze) with GWP of 6. These non-toxic refrigerants are expected to be used globally as higher GWP refrigerants are phasing down. It has been recognized that the mild flammability would require the deployment of leak detection sensors to eliminate potential fire hazards and asphyxiation risks in interior building spaces, either occupied by people or confine. In many areas, building codes are being developed that will mandate such gas detection capability.

The above types of sensors have been used with varying degrees of success in the industrial or laboratory settings where they have been employed. However, many such sensors have limitations that can impact their effectiveness in demanding new and existing applications such as commercial applications. For example, MOS and pellistor sensors are prone to false alarms due to cross-sensitivity to other volatile organic compounds such as alcohol or fuel vapor. Additionally, the durability of MOS sensors for detection of fluorinated hydrocarbons is questionable, as MOS sensors can be deactivated due to exposure to certain chemicals likely present in commercial and residential environment. NDIR sensors have been designed with good selectivity and sensitivity, but are an expensive solution and likely require periodic calibration when designed and used for refrigerant detection.

In view of the demanding requirements for selective and cost-effective gas sensor for refrigerants such as hydrofluoroolefins, there remains a need for new alternatives that may be more appropriate for various applications.

BRIEF DESCRIPTION

According to some embodiments, a sensor comprises a sensing electrode that includes a catalyst comprising palladium, and a counter electrode comprising a metal catalyst. An electrolyte is disposed between the sensing electrode and the counter electrode. An external circuit including a resistive load and a measurement device is connected with the capacitor at the sensing and counter electrodes to indicate the adsorption and release of molecules when transient current is measured on the resistive load in the absence of a voltage bias applied to the sensing and counter electrodes. The measurement device is configured to detect a capacitive electrical response produced by the exposure of the sensing electrode to a gas in the absence of a voltage bias applied to the sensing and counter electrodes.

According to some embodiments, a method of testing a gas comprises providing a sensor comprising a sensing electrode that includes a catalyst comprising palladium, and a counter electrode comprising a metal catalyst. An electrolyte is disposed between the sensing electrode and the counter electrode, and an external electrical circuit connects the sensing electrode and the counter electrode. A gas is contacted with the sensing electrode in the absence of a voltage bias applied to the sensing and counter electrodes. A capacitive response is detected that is produced by the exposure of the sensing electrode to the gas in the absence of a voltage bias applied to the sensing and counter electrodes.

In any of the above embodiments, the detected response in the electrical circuit produced by the exposure of the sensing electrode to the gas comprises a change in electrical current.

In any one or combination of the above embodiments, a concentration of a gas component is determined based on the response.

In any one or combination of the above embodiments, a determination of a gas component concentration comprises measuring a cumulative charge associated with chemical adsorption or desorption induced charging or discharging of the capacitive device to determine the concentration of olefin or substituted olefin in the gas.

In any one or combination of the above embodiments, the sensing electrode comprises at least 50 wt. % palladium, based on the total dry weight of metal catalyst, and/or catalyst support, and ionomer.

In any one or combination of the above embodiments, the sensing electrode comprises at least 10 wt. % palladium, based on the total dry weight of metal catalyst, and/or catalyst support, and ionomer.

In any one or combination of the above embodiments, the sensing electrode comprises at least 1 wt. % palladium based on the total dry weight of metal catalyst, and/or catalyst support, and ionomer.

In any one or combination of the above embodiments, the sensing electrode comprises an ionomer and nanoparticles comprising the palladium.

In any one or combination of the above embodiments, the electrolyte comprises a proton-conductive polymer membrane.

In any one or combination of the above embodiments, the gas comprises an olefin or a substituted olefin.

In any one or combination of the above embodiments, the gas comprises a hydrofluoroolefin.

In any one or combination of the above embodiments, the sensor further comprises a channel from an outer surface of the sensor to an interior chamber at the sensing electrode.

In any one or combination of the above embodiments, the sensor further comprises a blower that directs gas to the sensing electrode.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
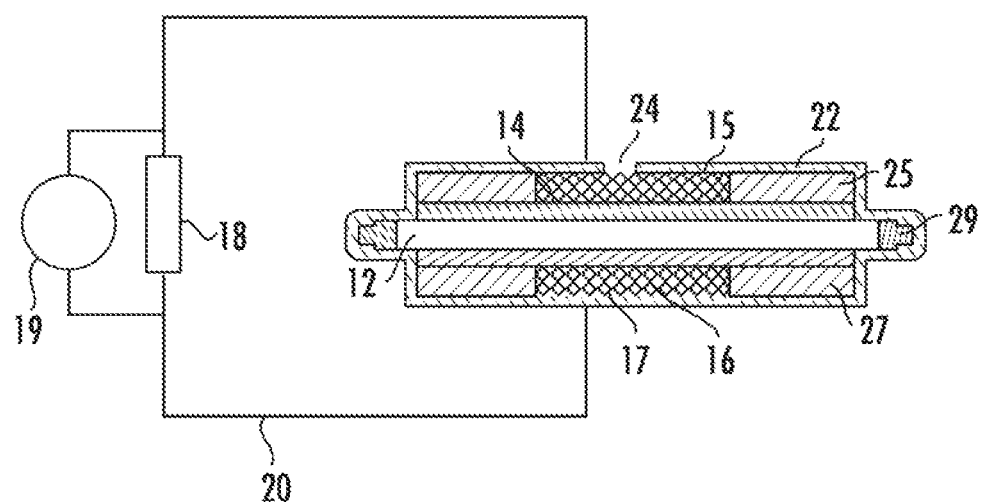
FIG. 1 depicts a schematic representation of a gas sensor as described herein.

With reference now to the Figures, a gas sensor assembly 10 is schematically shown in FIG. 1. As shown in FIG. 1, the gas sensor 10 includes an electrolyte 12 disposed between a sensing electrode 14 and a counter electrode 16. The electrolyte 12, sensing electrode 14, and counter electrode 16 can collectively be referred to as a membrane electrode assembly (MEA). Current collectors 15 and 17 are attached to the electrodes and are connected to circuit 18, which includes measurement and/or control device 19. The current collectors 15, 17 can be formed from a conductive mesh or felt, and are depicted with thickness so that they can also function as gas diffusion media to facilitate gas diffusion at the surface of the electrodes 14, 16. In other embodiments, the current collectors 15, 17 can be relatively thin, almost 2-dimensional conductive screens on the surface of the electrodes 14, 16, in which case gas diffusion media that does not have to be conductive can be positioned adjacent to the electrodes 14, 16. The current collectors gas diffusion media 15, 17 can be thrilled from conductive materials such as carbon, graphitized carbon, or stainless steel. An external resistive load 18 is connected with the capacitive sensor. Transient voltage drop across the load 18 is a manifestation of the charging or discharging of the electrochemical capacity. A measurement device 19 is disposed in an electrical circuit 20 that connects the sensing electrode 14 and counter electrode 16. The measurement device 19 can be a voltmeter or ampere meter, but in many cases comprises a circuit, microprocessor, or similar electronic device with integrated load and voltage and/or amperage measurement functions. In some embodiments, the resistive load 18 and measurement device 19 can be integrated together into a single unit.

Figure 2:
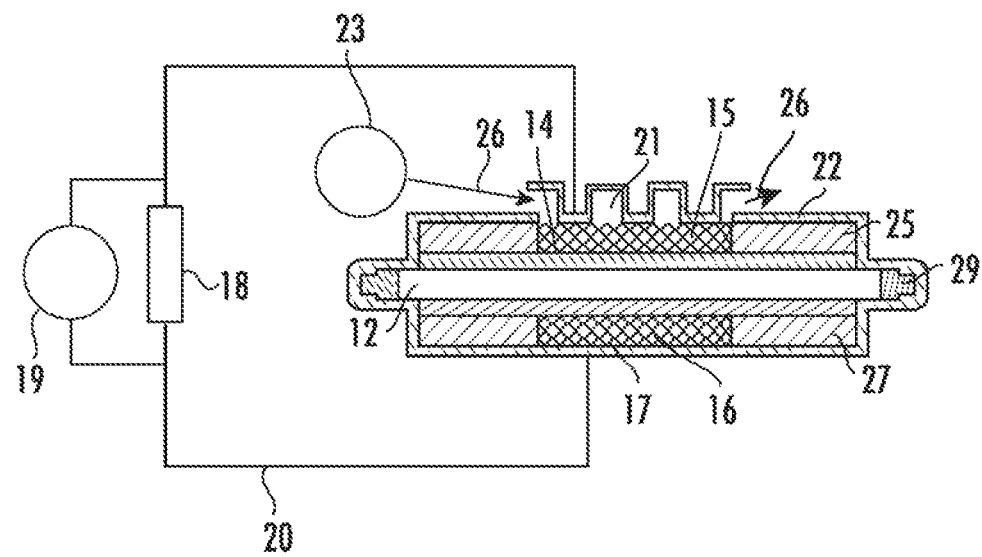
FIG. 2 depicts a schematic representation of another gas sensor as described herein.

A housing 22 is disposed around the MEA, having an opening 24 to allow a test gas to enter the sensor with the flux of gas regulated by the size of the opening. The opening 24 is shown as completely open, although it is understood that they may be covered with a screen or gas permeable membrane or an adsorber to keep out particulates or other contaminants. Also, although opening 24 is shown for purposes of illustration as leading directly to the current collector gas diffusion medium 15 in FIG. 1, a test gas can also be introduced into one or more interior chambers or channels 21 that provide access for test gas from an outer surface of the sensor to the sensing electrode 14, as shown in FIG. 2 (which uses the same numbering, from FIG. 1 to describe the same components). As further shown in FIG. 2, an optional fan or blower 23 can also be integrated with the sensor to direct test gas (represented by arrows 26) to the sensing electrode 14. With reference to FIGS. 1 and 2, seals 25, 27, and 29 provide isolation of the gas contact areas on the electrodes from other areas of the sensor assembly 10. The seals can be formed from rubber or other known sealing materials. The structure shown in FIGS. 1 and 2 depict specific example embodiments, and other techniques known in the art (e.g., disposing the MEA in a frame (not shown) that is sealed to the edges of the housing) can be used. The electrodes 14, 16 can be bonded to the solid polymer electrolyte 12, but can also be held together by other means such as mechanical clamping force without compromising the functionalities of the sensor. Exemplary gas sensor configurations and variations thereon are disclosed, for example, in U.S. Pat. Nos. 5,650,054, 5,573,648, 6,200,443, 6,948,352, US 2009/0184005 A1, and US 2010/0012494 A1 the disclosures of which are incorporated herein by reference in their entirety.

The precise composition of the electrodes, and materials used in fabricating them, will depend on the particular hydrocarbons being tested for and on design parameters tot the sensor and other system components with which it is used. As mentioned above, the sensing electrode comprises palladium, such as palladium on a conductive support such as carbon. Palladium in the electrode can be in pure form (with the term "pure" allowing for impurities at levels less than 1 wt. %), or can be in a mixture or alloyed with other metals such as gold, silver, nickel, copper, ruthenium, yttrium, platinum, iridium. In some embodiments, the metal composition of the sensing electrode can vary spatially (i.e., different compositions at different locations on the sensing electrode). In some embodiments, the sensing electrode can comprise pure palladium, at least 50 wt. % palladium, or at least 10 wt. % palladium, or at least 1 wt. % palladium, based on the total dry weight of metal catalyst, catalyst support (e.g., carbon support, if present) and ionomer in the sensing electrode. In some embodiments, the palladium and palladium particles along with their conductive support or conductive fillers accounts for more than ca. 30% of the volume of the electrode to promote formation of an electronic conducting phase that forms a continuous network for attaining capacitive response. In some embodiments, the sensing electrode can comprise palladium alloy, such as palladium-platinum alloy, at least 50 wt. % palladium-platium alloy, or at least 10 wt. % palladium-platium alloy, or at least 1 wt. % palladium-platium alloy, based on the total dry weight of metal catalyst, catalyst support (e.g., carbon support, if present) and ionomer, wherein the atomic ratio between palladium and platinum can range from 99:1 to 1:99, or in more specific embodiments from 10:1 to 3:1.

The counter electrode can comprise any of a variety of catalytic noble metals or non-precious metals and their alloys (e.g., iridium, rhenium, palladium, platinum, copper, indium, rubidium, silver, gold) can be used to form the electrodes. In some embodiments, the counter electrode can further comprise carbon supported catalytic metals and alloys with benefits of reduced catalyst use. In some exemplary embodiments, the counter electrode can comprise platinum or a binary or ternary platinum alloys such as PtNi, PtFe, PtCo, PtRu, PtRuNi, PtCr, PtCoCr, PtIrCo, or PtCuFe, wherein the Pt content in the alloys in atomic ratio ranges from 5% to 100%. In some embodiments, the counter electrode can comprise palladium, or a mixture or alloy of platinum and palladium. In some exemplary embodiments, the counter electrode can comprise palladium or a palladium alloy such as PdAg, PdNi, PdCu, PdRu, or PdY. The counter electrode catalyst composition can be the same as or different from the sensing electrode catalyst metal(s).

Figure 3:
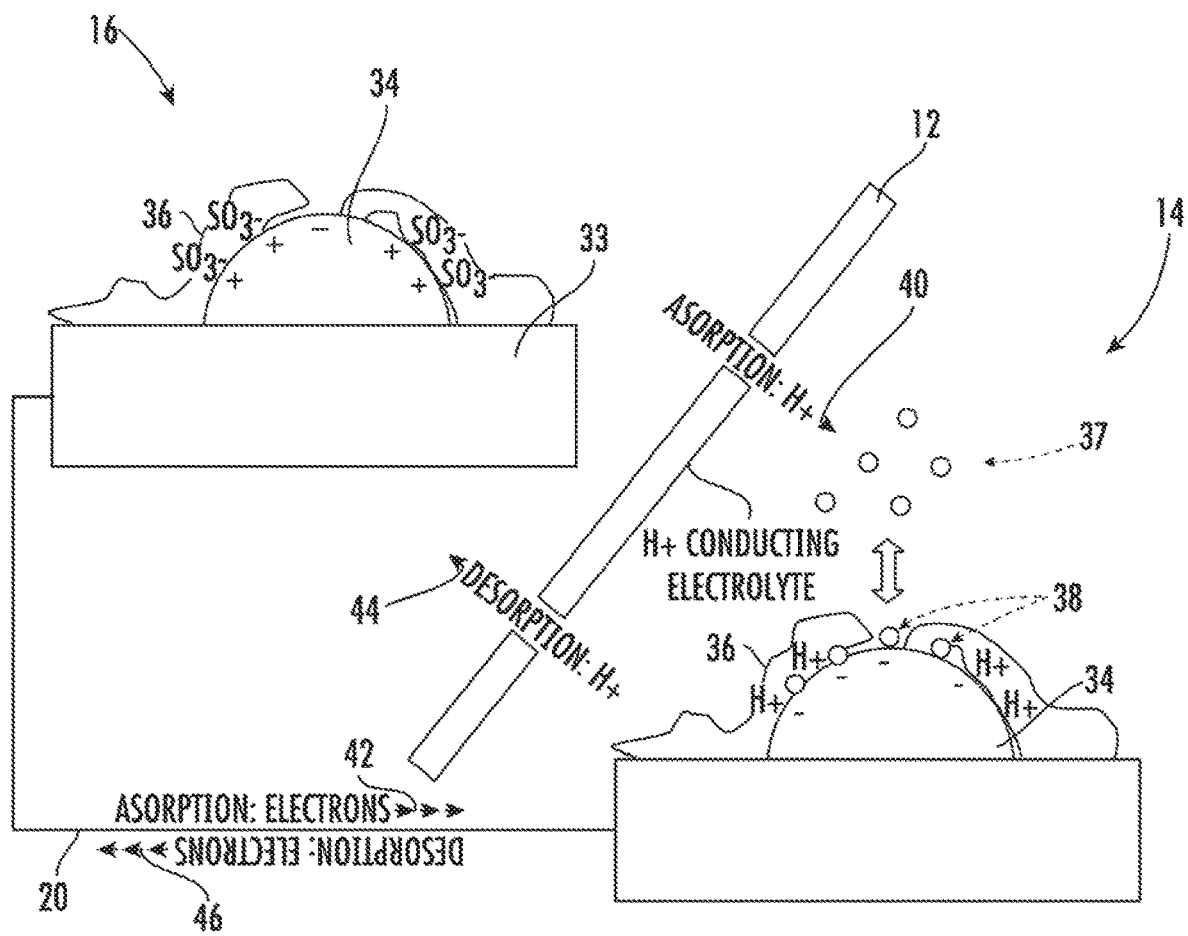
FIG. 3 depicts an exemplary illustration of a microscopic electrode structure comprising a supported catalyst impregnated with proton conducting ionomer, including reversible chemical charging/discharging of the sensor.

In some embodiments, the sensing and counter electrodes can include an electrically conductive material in addition to the noble metal catalyst, which can be provided by disposing nanoparticles of noble metal catalyst on lamer particles of conductors such as carbon black. Such electrode structures are commonly referred to as a carbon-supported catalyst. In some embodiments, the sensors described herein can comprise unsupported catalysts or catalysts supported on an oxidation-resistant support that is different from carbon black. For both unsupported catalyst and supported catalyst, the sensing electrode can be applied onto the solid polymer electrolyte by forming an ink comprising nanoparticles (by nanoparticles, it is meant that the particles have a nominal diameter of less than 20 nm, more specifically from 2-10 nm) and an ionomer dispersed in a solvent mixture, and depositing a layer of the ink onto the surface of the solid polymer electrolyte membrane by screen printing, ink jet printing, or similar methods. After evaporation of the solvent, the resultant electrode is in the form of a layer having a composite structure comprising catalyst nanoparticles in an ionomer matrix, where the ionomer functions as a conductive matrix material having catalyst nanoparticles dispersed throughout. A second method to fabricate the MEA is to deposit the electrode ink onto a substrate, i.e. Teflon™ or Kapton™ sheet, to make a decal after solvent evaporation, followed by hot pressing to transfer the catalyst layer from the decal onto a solid polymer electrolyte membrane. In the case of a supported catalyst for the sensing electrode, the catalyst can be supported on an oxidation-resistant conductive support, which can comprise oxidation-resistant support particles that are typically larger than the catalyst nanoparticles. In some exemplary embodiments, the support particles can have a nominal diameter of from 20 to 200 nm. A supported catalyst is depicted in FIG. 3, which depicts a portion of art agglomerate having conductive support particles 33 with catalyst particles 34 disposed thereon, fully or partially covered by a thin layer of ionomer 36. Examples of materials for the catalyst support in the sensing electrode include, but are not limited to carbon, graphitized carbon, carbon nanotubes (CNT), and conductive or semi-conductive metal oxides such as $TiO_2$, $WO_3$, $SnO_2$, etc. In another embodiment, the noble metal containing catalyst and conductive oxides can be co-loaded onto a support to achieve higher activity, for example Pt—$WO_3$/CNT. These conductive metal oxides can be undoped or they can be doped with metals such as Sb, V, Tl, Mn, Co, Fe, etc.

The electrolyte can be any type, including but not limited to a solid polymer electrolyte (SPE) formed from any ionomer capable of conducting protons across the electrolyte membrane between the sensing electrode and counter electrode. Exemplary ionic polymers include ionic groups attached to a polymer so that the polymer has the ionic-exchange ability, such groups including but not limited to sulfonic acid, phosphonic acid, and sulfonimide acid. Exemplary ionomers include per-fluorinated sulfonic acid ("PFSA") polymer, such as Nafion® ionomer and Solvey Solexis Auqivion™ ionomer, sulfonated polystyrene, sulfonated polysulfone, disulfonated poly(arylene ether sulfone) block-copolymers ("BPSH"). Conventional additives, e.g., surfactants, solvents (e.g., polyethylene glycol), and fine particles (such as functionalized or non-functionalized silica, carbon-based powders, metal-oxides particles) can also be added to the polymer matrix. The above-described ionomers for the solid polymer electrolyte can also be used as the ionomer for the electrodes.

In some embodiments, the solid polymer electrolyte and/or ionomer in the electrodes can be impregnated with a polar liquid such as an ionic liquid (e.g., a salt with its melting point near or below room temperature or the operating temperature of the sensor) or an aqueous salt or acid solution. Other types of electrolytes such as ionic liquids or aqueous salts or acids can be used, either impregnated into an organic or inorganic non-conductive porous support, or retained in an enclosed electrolyte chamber.

As mentioned above, the sensor can be operated by contacting the sensing electrode 14 with a gas. The sensor can test the gas for components that adsorb into the palladium-containing electrode. In some embodiments, the test gas component can comprise a flammable organic compound. In some embodiments, the test gas can comprise an olefin or a substituted olefin. In some embodiments, the gas can comprise a hydrofluoroolefin (HFO) as a substituted olefin. Examples of HFO's include unsaturated hydrocarbons of 2-10 carbon atoms wherein at least one hydrogen atom is substituted with a fluorine atom, and in some embodiments where all hydrogen atoms are substituted with fluorine atoms. Specific examples include tetrafluoropropene (R1234 isomers), 1-Chloro-3,3,3-trifluoropropene (HFO-1233zd), and 1,1,1,4,4,4-hexafluoro-2-butene (HFO-1336mzz-Z). The sensing electrode is contacted with the gas in the absence of a voltage bias applied to the sensing and counter electrodes 14, 16, and detecting a response is detected in the electrical circuit that is produced by the exposure of the sensing electrode to the gas in the absence of a voltage bias applied to the sensing and counter electrodes. It is believed that olefin and substituted olefin such as HFO molecules or other organic flammable molecules can adsorb onto the palladium-containing sensing electrode 14, which can result in surface accumulation of excess electrons in the metallic conductor of the sensing electrode 14, which are supplied from the metallic conductor of the counter electrode 16. Corresponding charge separation in the solid polymer electrolyte is established to maintain electro-neutrality at both catalyst (metal)/electrolyte interfaces. This phenomenon is illustrated in FIG. 3 where common numbering with FIG. 1 is used to describe the same components. As shown in FIG. 3, gas phase olefin or substituted olefin molecules 37 adsorb onto the surface as adsorbed molecules 38. During adsorption, protons 40 move across electrolyte membrane 12 from the counter electrode 16 to the sensing electrode 14 to the counter electrode 16, and electrons 42 flow through the circuit 20 from the counter electrode 16 to the sensing electrode 14. During desorption, protons 44 move across electrolyte membrane 12 from the sensing electrode 14 to the counter electrode 16, and electrons 46 flow through the circuit 20 from the sensing electrode 14 to the counter electrode 16. This process is analogous to charging a conventional capacitor except that the sensing device is charged chemically due to the selective adsorption of olefins and the like. This capacitive action produces a detectable response in the electrical circuit 20. As equilibrium is reached between adsorbed molecules and molecules in the gas phase, the electrical response dissipates.

The total charge transferred between the working electrode and the counter electrode is proportional to the concentration of gas components (e.g., olefins or substituted olefins) in the gas as long as excess surface of Pd catalyst remains available for adsorption, allowing for concentration of targeted species to be determined by comparing the response to predetermined calibration data. In some embodiments, the test gas can comprise a flammable component or components at a level, expressed as a percentage of the component's lower flammability limit (LFL), in a range having a lower limit of 1%, 5%, 10%, or 25%, and an upper limit of 100%, 75%, or 50%, or 25%, The LFL will vary depending on the compound, but are known in the art or readily determined by simple experimentation. For example, the LFL of the hydrofluoroolefine R1234ze is 7 vol. %. The above range endpoints can be independently combined to serve as a disclosure of a number of different ranges (except for impossible ranges where the disclosed lower limit is greater than or equal to the disclosed upper limit), which are hereby expressly disclosed. Because the species to be detected do not involve charge transfer at the metal/electrolyte interface, the targeted species remain unchanged and will be released back to the gas phase when its gaseous phase concentration decreases or it becomes absent in the surrounding environment. This desorption process allows non-polarized electron distribution to be restored and negates the charge separation in the solid electrolyte phase, leading to a reverse current being produced in the external circuit. This is a reversible process, which can produce a technical effect of extraordinary durability of the sensor to overcome deactivation induced by reactions on interface including electrochemical reactions that often plague conventional electrochemical or MOS sensors. Thus, in some embodiments, a concentration of targeted species can be determined by cumulative charge dissipation associated with the desorption of those species as well. If the event that the initial electrical response dissipates without additional electrical responses, it can be deduced that the concentration has not changed from the initial measured concentration.

In some embodiments, the methods and sensors described herein can detect olefin or substituted olefin without the need for an applied voltage bias between sensing and counter electrodes as is typically required for electrochemical sensors that oxidize hydrocarbons at the sensing electrode. This can provide technical effects such as reduced power consumption and longer sensor lifespan, as discussed above. Additionally, the adsorption and desorption characteristics of the sensor operation can provide fast response times with little hysteresis between the adsorption and desorption modes. However, although an applied voltage bias is not required, and in some embodiments is precluded, in some embodiments an applied voltage bias is not precluded and can be applied for some portion of operation of the sensor.

Further description is provided in the following examples.

EXAMPLES

Figure 4:
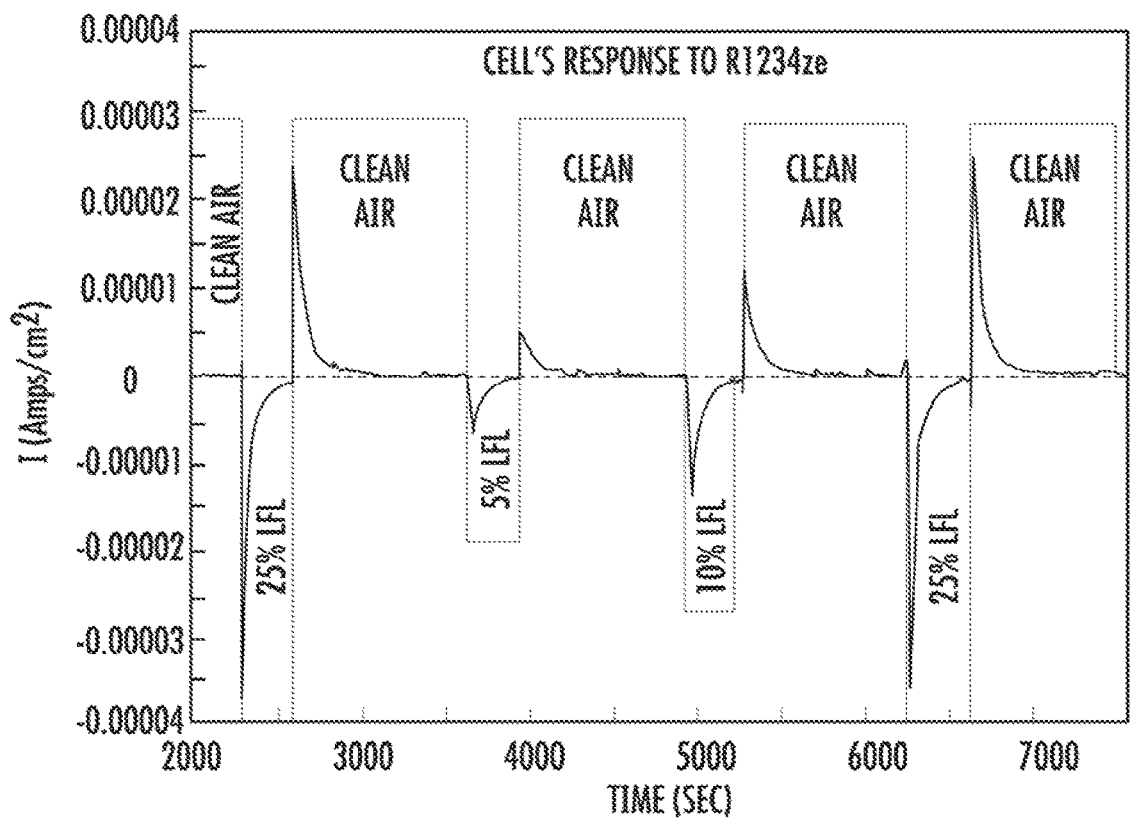
FIG. 4 depicts current response of a sensor as described herein.
Figure 5:
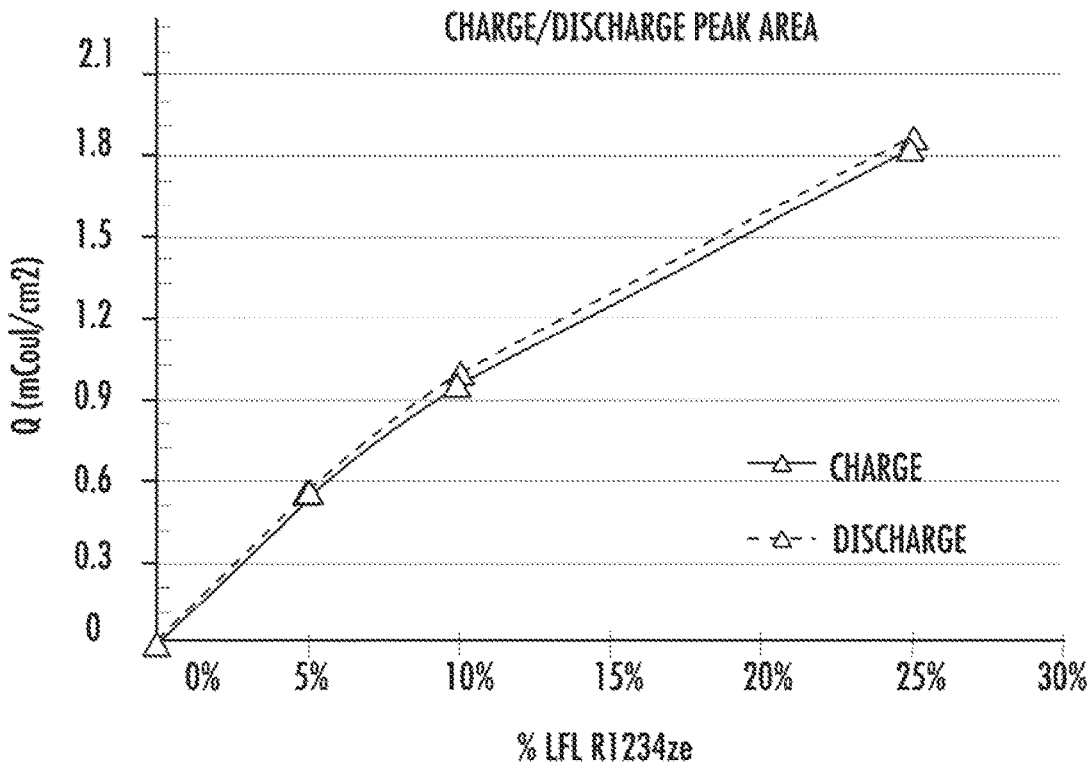
FIG. 5 depicts charge and discharge response of a sensor as described herein.

A prototype sensor configured as shown in FIG. 1 with a counter electrode exposed to air was subjected to exposure to varying concentrations of the substituted hydrocarbon R1234ze, interspersed with exposure to clean air. The sensor response is shown in FIG. 4. As shown in FIG. 4, the sensor effectively identified the substituted hydrocarbon with a response that increased with increasing concentration. The dissipation of the responses as equilibrium was reached is also seen, along with a magnitude of initial response (i.e., peak height and/or peak area under the curve, which can be matching the curve to a mathematical function with integral processing) that is proportional to R1234ze concentration. FIG. 5 shows the charge/discharge peak area for the exposures to different levels of R1234ze, which is seen to exhibit a good linear relationship between the peak area and R1234ze concentration, and little to no hysteresis between the charge and discharge modes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of testing a gas, comprising:
   providing a sensor comprising a sensing electrode that includes a catalyst comprising palladium, a counter electrode comprising a metal catalyst, an electrolyte disposed between the sensing electrode and the counter electrode, and an electrical circuit connecting the sensing electrode and the counter electrode;
   contacting the gas with the sensing electrode in the absence of a voltage bias applied to the sensing and counter electrodes; and
   detecting a capacitive response produced by the exposure of the sensing electrode to the gas,
   wherein the gas comprises an olefin or a substituted olefin,
   wherein contacting the gas with the sensing electrode comprises adsorption of the olefin or substituted olefin onto the sensing electrode, and
   wherein detecting the capacitive response produced by the exposure of the sensing electrode to the gas comprises detecting the capacitive response produced by adsorption of the olefin or substituted olefin onto the sensing electrode.

2. The method of claim 1, wherein the detected response in the electrical circuit produced by the exposure of the sensing electrode to the gas comprises a change in electrical current.

3. The method of claim 1, further comprising determining a concentration of the olefin or a substituted olefin based on the capacitive response.

4. The method of claim 3, comprising measuring a cumulative charge associated with olefin or substituted olefin adsorption or desorption induced charging or discharging of the capacitive device to determine the concentration of the component in the gas.

5. The method of claim 1, wherein the sensing electrode comprises at least 50 wt. % palladium, based on the total dry weight of metal catalyst, and/or catalyst support, and ionomer.

6. The method of claim 1, wherein the sensing electrode comprises at least 10 wt. % palladium, based on the total dry weight of metal catalyst, and/or catalyst support, and ionomer.

7. The method of claim 1, wherein the sensing electrode comprises at least 1 wt. % palladium, based on the total dry weight of metal catalyst, and/or catalyst support, and ionomer.

8. The method of claim 1, wherein the sensing electrode comprises an ionomer and nanoparticles comprising the palladium.

9. The method of claim 1, wherein the gas comprises a hydrofluoroolefin, and wherein contacting the gas with the sensing electrode comprises adsorption of the hydrofluoroolefin onto the sensing electrode.

10. A sensor, comprising
a sensing electrode that includes a catalyst comprising palladium;
a counter electrode comprising a noble metal catalyst;
an electrolyte disposed between the sensing electrode and the counter electrode; and
an external electrical circuit including a resistive load and a measuring device controller operatively connecting the sensing electrode and the counter electrode, said measuring device configured to detect a capacitive electrical response in the electrical circuit produced by the exposure of the sensing electrode to a gas comprising an olefin or a substituted olefin in the absence of a voltage bias applied to the sensing and counter electrodes,
wherein the sensing electrode is configured to adsorb the olefin or substituted olefin, and
wherein said measuring device is configured to detect the capacitive response produced by adsorption of the olefin or substituted olefin onto the sensing electrode.

11. The sensor of claim 10, wherein the sensing electrode comprises at least 50 wt. % palladium, based on the total dry weight of metal catalyst, and/or catalyst support, and ionomer.

12. The sensor of claim 10, wherein the sensing electrode comprises at least 10 wt. % palladium, based on the total dry weight of metal catalyst, and/or catalyst support, and ionomer.

13. The sensor of claim 10, wherein the sensing electrode comprises at least 1 wt. % palladium, based on the total dry weight of metal catalyst, and/or catalyst support, and ionomer.

14. The sensor of claim 10, wherein the sensing electrode comprises an ionomer and nanoparticles comprising the palladium.

15. The sensor of claim 10, wherein the measuring device is further configured to determine a concentration of the olefin or a substituted olefin based on the electrical response.

16. The sensor of claim 15, wherein the measuring device is configured to measure a cumulative charge associated with olefin or substituted olefin adsorption or desorption induced charging or discharging of the capacitive device to determine the concentration of the component in the gas.

17. The sensor claim 10, further comprising a channel from an outer surface of the sensor to an interior chamber at the sensing electrode.

18. The sensor of claim 10, further comprising a blower that directs gas to the sensing electrode.

* * * * *